Aug. 4, 1953  F. ZIHERL  2,647,303
METHOD OF MANUFACTURING PIPE FITTINGS AND THE LIKE
Filed Nov. 17, 1948
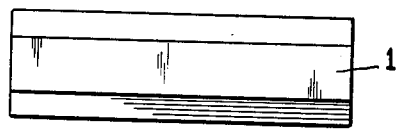
Fig. 1
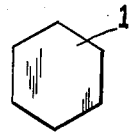
Fig. 2
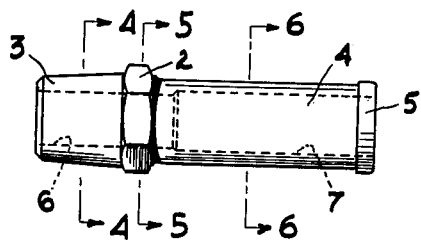
Fig. 3
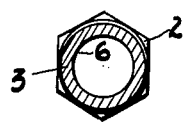
Fig. 4
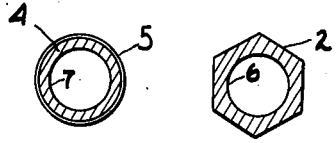
Fig. 6    Fig. 5
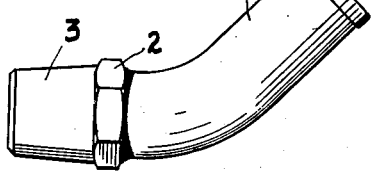
Fig. 7
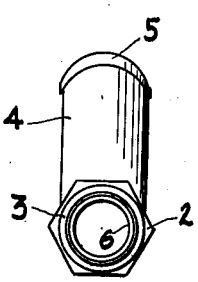
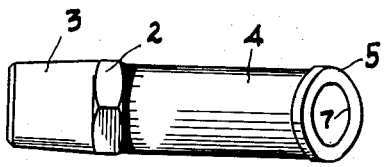
Fig. 8
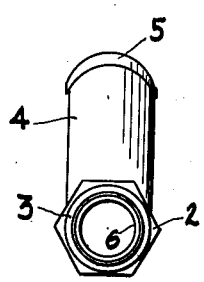
Fig. 9
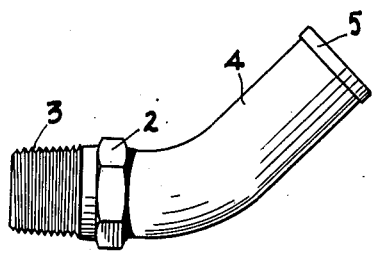
Fig. 10
INVENTOR.
FRANK ZIHERL
BY
William Isler
ATTORNEY.

Patented Aug. 4, 1953

2,647,303

UNITED STATES PATENT OFFICE 2,647,303

METHOD OF MANUFACTURING PIPE FITTINGS AND THE LIKE

Frank Ziherl, Euclid, Ohio, assignor to Z & W Machine Products, Inc., a corporation of Ohio Application November 17, 1948, Serial No. 60,517

1 Claim. (Cl. 29—157)

This invention relates, as indicated, to a method of manufacturing pipe fittings and the like.

A primary object of the invention is to provide a pipe fitting, such, for example, as an elbow, which can be manufactured at considerably less cost than similar fittings heretofore made in the form of castings of copper, brass and similar non-ferrous metals.

Another object of the invention is to provide a pipe fitting of the character described, which is corrosion-resistant and is also characterized by high tensile strength, resistance to deformation in use, and other desirable properties.

A further object of the invention is to provide a pipe fitting which is capable of general application or use, but which is especially adapted for use in the hot water heating systems of automobiles and the like.

Other objects and advantages of my invention will be apparent during the course of the following description.

Although the invention is generally applicable to the manufacture of various types and shapes of pipe fittings, such as elbows, couplings, etc., I have, for purposes of illustration, described the invention specifically in connection with the manufacture of a 45° elbow, of a type commonly used in the hot water heating systems of automobiles and the like.

In the accompanying drawings forming a part of this specification, and in which like numerals are employed to designate like parts throughout the same, Fig. 1 is a side elevational view of a length of hexagonal bar stock, illustrating the first steps in the method of making a 45° elbow;

Fig. 2 is a cross-sectional view, taken on the line 2—2 of Fig. 1;

Fig. 3 is a view similar to Fig. 1, but showing the second step in the method;

Fig. 4 is a cross-sectional view, taken on the line 4—4 of Fig. 3;

Fig. 5 is a cross-sectional view, taken on the line 5—5 of Fig. 3;

Fig. 6 is a cross-sectional view, taken on the line 6—6 of Fig. 3;

Fig. 7 is a view similar to Fig. 3, but showing the third step in the method;

Fig. 8 is a top plan view of the article shown in Fig. 7;

Fig. 9 is an end elevational view, as viewed from the left end of Fig. 8, and

Fig. 10 is a view similar to Fig. 7, but showing the fourth step in the method.

Referring more particularly to the drawings, I first take a length 1 of hexagonal bar stock, of substantially the length of the final elbow. The stock is preferably a free-machining steel.

I then machine and drill the length 1 of stock to provide a blank, such as shown in Figs. 3, 4, 5 and 6, having an intermediate portion 2 having the external hexagonal cross-section of the original bar stock, an end portion 3 of circular external cross-section, and an end portion 4 of circular cross-section, terminating in a flange 5. The blank is drilled to provide a bore 6 and bore 7, the bore 7 being of slightly larger diameter than the bore 6. The machining and drilling operations are performed simultaneously on automatic machine tools, which, for the purpose of this invention, need not be described.

Following the formation of the aforesaid blank, the blank is annealed to soften it to an extent sufficient to permit it to be bent to the contour or form shown in Figs. 7, 8 and 9, which is that of a conventional 45° elbow. This bending is preferably performed on a punch press or similar press, instead of on a conventional pipe bending machine, since it has been found that the bending can be performed more quickly and economically in this manner.

The end portion 3 of the elbow is then externally threaded, as shown in Fig. 10, and if a corrosion-resistant finish is desired, the elbow may be cadmium-plated or coated with some other corrosion-resistant covering.

An elbow, as thus manufactured, can be made at considerably less cost than similar fittings heretofore made in the form of castings of copper, brass and similar non-ferrous metals. The elbow is corrosion-resistant by virtue of the cadmium-plating thereof, has high tensile strength, and has high resistance to deformation in use as well as other desirable physical properties. It is capable of general application or use, but is particularly adapted for use in hot water heating systems of automobiles and the like.

It is superior, in every respect, to elbows and similar fittings made from steel tubing or the like, principally by virtue of the fact that it can be easily manipulated, connected and disconnected, by the use of conventional open-end wrenches, as by engagement of the wrench with the hexagonal portion 2 of the elbow. In this manner, the use of pipe wrenches is rendered unnecessary, so that the elbow does not become marred or scratched during removal or replacement thereof. This is also considerable advantage, since automobile tool kits are usually provided with open end wrenches, but not pipe wrenches. Moreover, since the hexagonal portion 2 of the elbow is integral with the elbow, there is no possibility of stripping off this portion of the elbow, which would be possible in the case of a hex nut or sleeve which is soldered or threaded onto conventional tubing.

It is to be understood that various changes may be made in the details of method, as described, and in the shape, size and arrangement of various portions of the fittings, without departing from the spirit of my invention or the scope of the subjoined claim.

Having thus described my invention, I claim:

The method of manufacturing elbows which comprises cutting steel bar stock of non-circular external cross-section into lengths substantially equivalent to the finished length of the elbow, drilling a length to provide a bore extending therethrough and machining the external surface but leaving a portion thereof intermediate its ends of unaltered external cross-section, then bending said length at a point adjacent one side of said unaltered portion, so as to form angularly related portions, and then exteriorly threading the portion of said length at the other side of said unaltered portion, said sequence of operations avoiding injury to the threads of said exteriorly threaded portion during the manufacture of said elbows.

FRANK ZIHERL.

References Cited in the file of this patent

UNITED STATES PATENTS

| Number | Name | Date |
|---|---|---|
| 1,203,982 | Collette | Nov. 7, 1916 |
| 1,225,788 | Dies | May 15, 1917 |
| 1,426,324 | Slick | Aug. 15, 1922 |
| 1,784,080 | Stresau | Dec. 9, 1930 |
| 1,775,331 | Trainor et al. | Sept. 9, 1930 |
| 2,134,853 | Boisson | Nov. 1, 1938 |
| 2,152,102 | Stecher | Mar. 28, 1939 |
| 2,155,080 | Cornell | Apr. 18, 1939 |
| 2,460,622 | Crawley | Feb. 1, 1949 |
| 2,462,291 | Sette | Feb. 22, 1949 |
| 2,500,890 | Wurzburger | Mar. 14, 1950 |
| 2,517,706 | Paquin | Aug. 8, 1950 |

OTHER REFERENCES

The Book "Metalworking," pub. by Cassell & Co., New York, N. Y., pp. 558 and 559. (Copy in Div. 14.)